(12) United States Patent
Mehta et al.

(10) Patent No.: US 8,868,707 B2
(45) Date of Patent: Oct. 21, 2014

(54) ADAPTIVE WRITE-BACK AND WRITE-THROUGH CACHING FOR OFF-LINE DATA

(75) Inventors: Nikunj R. Mehta, Cupertino, CA (US); Garret Swart, Palo Alto, CA (US); Colm Divilly, Wicklow (IE); Ashish Motivala, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 1404 days.

(21) Appl. No.: 12/485,801

(22) Filed: Jun. 16, 2009

(65) Prior Publication Data

US 2010/0318640 A1    Dec. 16, 2010

(51) Int. Cl.
*G06F 15/173* (2006.01)
*H04L 29/08* (2006.01)
*H04L 29/06* (2006.01)

(52) U.S. Cl.
CPC ........ *H04L 63/0884* (2013.01); *H04L 67/2842* (2013.01); *H04L 63/08* (2013.01)
USPC ............................ 709/223; 709/227; 709/229

(58) Field of Classification Search
CPC .............. G04F 17/30893; H04L 63/08; H04L 63/0884; H04L 67/2842
USPC ........... 709/225, 223, 227, 229; 711/100, 154
See application file for complete search history.

(56) References Cited

U.S. PATENT DOCUMENTS

| | | | |
|---|---|---|---|
| 6,453,320 | B1 | 9/2002 | Kukura et al. |
| 6,473,758 | B1 | 10/2002 | Schwartz et al. |
| 6,766,335 | B2 | 7/2004 | Kukura et al. |
| 7,089,278 | B1 | 8/2006 | Churchill et al. |
| 7,472,411 | B2 | 12/2008 | Wing et al. |
| 7,590,844 | B1 | 9/2009 | Sherman et al. |
| 7,747,856 | B2 | 6/2010 | Favazza et al. |
| 7,748,047 | B2 | 6/2010 | O'Neill |
| 7,853,648 | B1 | 12/2010 | Chalfin et al. |

(Continued)

FOREIGN PATENT DOCUMENTS

| | | |
|---|---|---|
| EP | 1953668 A2 | 8/2008 |
| EP | 1953669 A2 | 8/2008 |
| JP | 2008187718 A | 8/2008 |
| WO | WO 2007/036024 | 4/2007 |

OTHER PUBLICATIONS

S. Keshav. "An Engineering Approach to Computer Networking." pp. 509-522 (15 Pages total). Copyright 1997.*

(Continued)

*Primary Examiner* — Mohamed Wasel
(74) *Attorney, Agent, or Firm* — Hickman Palermo Truong Becker Bingham Wong LLP (57) ABSTRACT

Techniques for facilitating communication between an application and a server are provided. An intermediary sits between an application and a server. The intermediary intercepts and responds to communications on behalf of the intended recipient of the communication. In one technique, the intermediary relays a request to the server and receives a response from the server. The intermediary updates a local store with data that is implied by the protocol to which the request conforms and determined based on the request. In another technique, the intermediary intercepts a request to access data on the server. The intermediary determines, based on characteristics of a computing device, that the request should be responded to using data that is available in a local store. The intermediary responds to the request using that data.

38 Claims, 3 Drawing Sheets

(56) References Cited

U.S. PATENT DOCUMENTS

| | | | |
|---|---|---|---|
| 7,890,570 B2 | 2/2011 | Mazzaferri | |
| 8,132,242 B1 | 3/2012 | Wu | |
| 8,139,483 B2 | 3/2012 | Bauer et al. | |
| 2002/0059531 A1* | 5/2002 | Lai On | 713/202 |
| 2002/0069282 A1* | 6/2002 | Reisman | 709/227 |
| 2002/0099850 A1 | 7/2002 | Farber et al. | |
| 2002/0099952 A1 | 7/2002 | Lambert et al. | |
| 2003/0105735 A1 | 6/2003 | Kukura et al. | |
| 2003/0149793 A1 | 8/2003 | Bannoura et al. | |
| 2004/0122877 A1 | 6/2004 | Nakayama | |
| 2005/0144451 A1 | 6/2005 | Voice et al. | |
| 2005/0174937 A1 | 8/2005 | Scoggins et al. | |
| 2006/0015933 A1 | 1/2006 | Ballinger et al. | |
| 2006/0143703 A1* | 6/2006 | Hopen et al. | 726/15 |
| 2006/0167975 A1 | 7/2006 | Chan et al. | |
| 2008/0028073 A1* | 1/2008 | Trabe et al. | 709/225 |
| 2008/0201331 A1* | 8/2008 | Eriksen et al. | 707/10 |
| 2009/0119504 A1* | 5/2009 | van Os et al. | 713/153 |
| 2009/0234972 A1* | 9/2009 | Raghu et al. | 709/246 |
| 2010/0002880 A1 | 1/2010 | Yoon et al. | |
| 2010/0083364 A1 | 4/2010 | Fernandez Gutierrez | |
| 2010/0318640 A1 | 12/2010 | Mehta et al. | |
| 2010/0319054 A1 | 12/2010 | Mehta et al. | |

OTHER PUBLICATIONS

"Sessions at Google I/O" Developer Conference May 27-28, 2009 downloaded from the Internet Apr. 28, 2009 < http://code.google.com/events/io/sessions.html > (3 pages).

"NSURLProtocol Class Reference" downloaded from the Internet Jun. 11, 2009 < http://developer.apple.com/documentation/Cocoa/Reference/Foundation/Classes/NSURLP . . . > (8 pages).

<< Asynchronous Pluggable Protocols >> 2009 Microsoft Corporation downloaded from the Internet Jun. 11, 2009-11-12< http://msdn.microsoft.com/en-us/library/aa767743(VS.85,printer).aspx (4 pages).

* cited by examiner

ADAPTIVE WRITE-BACK AND WRITE-THROUGH CACHING FOR OFF-LINE DATA

FIELD OF THE INVENTION

The present invention relates generally to management and delivery of data and, more specifically, to techniques for managing off-line data.

BACKGROUND

Many mobile computing applications rely on data that resides on a machine that is remote to the device on which the application runs. Although an application may be robust, lack of network connectivity or access to a required server may cause the application to behave unpredictably or provide incorrect information. For example, a calendar application running on a smart-phone may display an error when it is unable to access the server on which the calendar information resides.

Lack of network availability or server connectivity may occur because of a variety of factors. For example, servers are often not configured for high-availability. Further, networks may not reach many locations, and are therefore not ubiquitous. This lack of connectivity disappoints users that rely on instantaneous information. Mobile networks are particularly problematic in this way, due to limited coverage in areas that may seem random to the ordinary user.

To ensure predictable behavior in mobile computing applications, many applications allow for off-line data storage. There are several methods of providing off-line storage: 1) Data is stored locally, and backed up on the server; 2) A local cache and a server store are used, each relying on distinct data models and access methods; and 3) A local cache and a server store are used, each relying on the same data model but using distinct access methods.

Where data is stored locally, and backed up on the server, as in the first method, a database, application server, and application client may be installed on a client device. Data in the database and any other application data need to be synchronized with the remote system. The synchronization techniques used are application specific.

In the second method, the local database is often better suited to local processing, and stores a transformation of the online data. Due to the application-specific transformation of data, applications sharing data must conform to the transformation. Further, in this model, applications employ a data switch between on-line and off-line operation, explicitly accessing the local database when off-line. This method in effect creates two separate applications that are accessible via the same user interface.

In the third method, the data model remains the same among the application and the server, but the access methods differ. Applications use HTTP requests and responses when working on-line, and store the responses in a local database. This storage is used for off-line operation. Applications must still employ a data switch, but data is not transformed. Using the locally stored data, however, results in additional processing not required for on-line operation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
      2.1 Structural Overview
      2.2 Functional Overview
   3.0 Managing Data
      3.1 Accessing, Creating, and Modifying Data
      3.2 Interposition
      3.3 Local Storage of Data
      3.4 Write-Through Caching of Data
      3.5 Write-Back Caching of Data
      3.6 Bi-Directional Synchronization
      3.7 Example Embodiment
      3.8 Protocols
      3.9 Security Considerations
   4.0 Implementation Mechanisms—Hardware Overview

1.0 General Overview

In one embodiment, an intermediary lies between a client program and a server. The intermediary intercepts a request from an application running on a computing device. The request, which conforms to a protocol, is a request to store data at a location remote to the device and the intermediary. Without storing the data at the server, the intermediary responds to the request. The response conforms to the protocol, and specifies to the application that the request to store data has been honored. The intermediary intercepts another request from the application, which also conforms to the protocol. This time, the request is a request to access at least a portion of the data at the server. The intermediary responds to the request by returning at least a portion of the data, without accessing the server.

In another embodiment, the intermediary subsequently causes the data to be stored at the server.

In an embodiment, the intermediary intercepts another request to access at least a portion of the data at the server. The intermediary accesses the data and stores the data at a location local to the intermediary. In one embodiment, the data is stored as a bitstream.

In an embodiment, upon intercepting a request to retrieve data from a server, the intermediary determines that the server is unreachable. The intermediary responds to the request by providing stored data.

2.0 Structural and Functional Overview

2.1 Structural Overview

Figure 1:
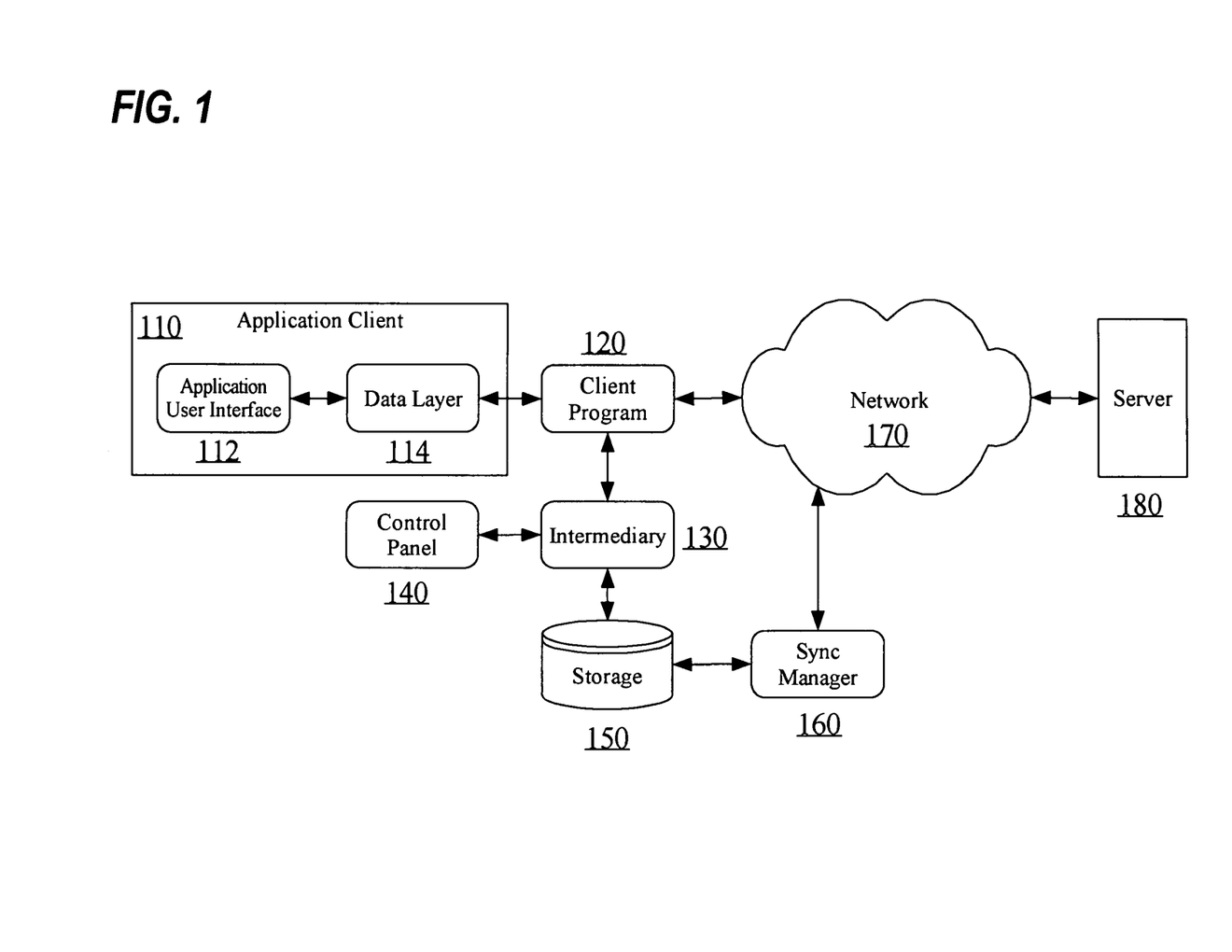
FIG. 1 is a block diagram illustrating an architecture on which an embodiment may be implemented.

FIG. 1 is a block diagram that illustrates an architecture on which an embodiment may be implemented. Application client 110 is made up of an application user interface 112 and a data layer 114. The data layer 114 is coupled to client program 120. Client program 120 may be a web browser or any other type of agent. Client program 120 and server 180 are each coupled to Network 170. Client program 120 is also connected to intermediary 130.

Intermediary 130 is coupled to control panel 140 and storage 150. Intermediary 130 may be a browser plug-in, and be embedded in the same process as client program 120.

Control panel 140 may be used to configure intermediary 130 or other elements in the system for which the control panel has been given authorization to configure. Synchronization manager (Sync manager) 160 is coupled to Network 170. Sync manager 160 manages the synchronization of data between storage 150 and server 180. Sync manager 160 may be a browser plugin and may be embedded into the same process as client program 120.

Although FIG. 1 provides a specific architecture, this architecture is flexible, and represents only one embodiment. Certain elements of FIG. 1 may be combined, connected in a different way, or even separated further. For example, intermediary and sync manager 160 may be combined. Further, intermediary 130 may be combined with client program 120. Other elements, such as Network 170 may be discarded altogether in favor of a private network connecting client program 120 directly to server 180. Finally, server 180 may be a local server or a server running on the same computing device as client program 120.

2.2 Functional Overview

Application client 110 is an application that may request remote data. For example, application client 110 may represent a to-do list application, calendar application, or expense report application for a mobile device such as a smart-phone, personal digital assistant, or laptop. In an embodiment, application client may run on a computing device that is not a mobile device.

Server 180 may be a computing device running server software or other proprietary software capable of honoring requests from an application client. Server 180 is capable of storing data either locally or remotely. For example, server 180 may be coupled to a database management system (DBMS) such as a DBMS offered by Oracle Corporation. Server 180 may use a DBMS as a repository for application data such as the data required by application client 110.

Application client 110 interacts with server 180 through a user agent such as client program 120. Client program 120 may be a web browser capable of communicating with server 180 using standard protocols such as Hypertext Transfer Protocol (HTTP).

Intermediary 130 is a protocol-aware interposition agent capable of intercepting and responding to communications between an application such as application client 110 and a server such as server 180. Furthermore, intermediary 130 may interact with multiple applications and servers. Intermediary 130 may be configured, via control panel 140, to intercept and respond only to communications that are associated with particular applications. For example, a mobile device may have five applications, but intermediary 130 may be configured to intercept communications associated with two of the applications, and not the other three.

Intermediary 130 may use storage 150 to store intercepted application requests and data from server 180. Sync manager 160 may be configured to periodically synchronize data residing in storage 150 with data managed by server 180. Alternatively, sync manager 160 may synchronize data at hard-coded intervals, upon the detection of particular events, or upon manual intervention.

3.0 Managing Data

3.1 Accessing, Creating, and Modifying Data

Web data may be accessed and manipulated through the use of a variety of protocols and methods. Hypertext Transfer Protocol (HTTP), Secure Hypertext Transfer Protocol (S-HTTP), File Transfer Protocol (FTP), Internet Message Access Protocol (IMAP) are some examples of application layer protocols that may be used to manipulate remote data. Many data access and management protocols work in conjunction with other protocols, such as HTTP. Atom is one such protocol.

Atom is a term used to refer to Atom-based protocols. The Atom Syndication Format is an XML based protocol that defines the way that web feeds are presented. The Atom Publishing Protocol is an HTTP-based protocol that defines the requirements for updating, creating, and modifying web-based resources. Atom allows users to view, edit, and add content to a particular grouping of data, or container object comprising contained objects, called a "feed." Many protocols offer such feeds. An example of an Atom feed can be seen below:

```
<?xml version="1.0" encoding="utf-8"?>
<feed xmlns="http://www.w3.org/2005/Atom">
    <title>Example Feed</title>
    <link href="http://example.org/"/>
    <updated>2003-12-13T18:30:02Z</updated>
    <author>
        <name>John Doe</name>
    </author>
    <id>urn:uuid:60a76c80-d399-11d9-b93C-0003939e0af6</id>
    <entry>
        <title>Atom-Powered Robots Run Amok</title>
        <link href="http://example.org/2003/12/13/atom03"/>
        <id>urn:uuid:1225c695-cfb8-4ebb-aaaa-80da344efa6a</id>
        <updated>2003-12-13T18:30:02Z</updated>
        <summary>Some text.</summary>
    </entry>
</feed>
```

Atom feeds represent collections of data and metadata. A feed may contain multiple entries, also known as entry documents. An Atom feed has a unique Uniform Resource Locator (URL). Accessing and manipulating data on a server that supports Atom Publishing Protocol is done via the URL for that feed. Operations such as GET, POST, PUT, and DELETE are performed on URLs. Each group of data and each entry in the grouping correspond to a URL. For example, adding an entry to a group of data results in the creation of a new URL. This may be done via a POST request on the feed URL. Removing an entry may be done by sending an HTTP DELETE request to the appropriate edit URL.

Individual entries may also be edited, added, and modified. To edit an entry, an editable representation of the entry may be requested by URL. Once modifications are made, a simple PUT request may be issued to the entries Edit URL to save the modified entry.

Atom is not limited to the use and distribution of text-based data. Audio recordings, photographs, and other documents may be added to an Atom feed. A wide variety of media objects may be uploaded and managed using Atom. To upload a media file, a POST request is sent to the collection URL, but instead of including an Atom Entry Document, a representation of the media resource is included.

Atom and other protocols provide formats for data publishing and retrieval. Rather than creating content management formats, application developers may configure an application to recognize a particular format, defined by a protocol.

Although protocols such as Atom may be used to create and deliver content, it is also possible for the creation of an entry in a feed to trigger an event. For example, an expense report application on a mobile device may allow the user to add an entry to an expense report residing on a remote server. The remote server, detecting an entry to the expense report, may react to the addition by sending a notification to a person designated as the approver of expenses.

In addition to event triggering, many protocols such as Atom exhibit side effects that are implied by the protocol. These protocol side effects are referred to herein as "observable side effects" because these side effects of a request are implied by the protocol used, and may be assumed based on protocol-specific information in the response. The observable side effects of a first request using the protocol may make changes to state or data that may be viewed or accessed by a client in a subsequent request. For example, a client may send a request to a server, asking for X to be changed. However, in the process of changing X, according to the protocol, Y must be changed. An observer would become aware of Y when the response is sent. A subsequent request for Y will result in the delivery of the altered version of Y. In Atom, a request may be made, requesting that a server change an entry in a feed. Necessarily, the feed is also changed. When the response is sent, confirming the change, an observer of the response will become aware of the feed having changed on the server.

While Atom may be used to provide examples of embodiments of the invention, the invention is not limited to a particular protocol. Section 3.5 further discusses the use of various protocols in embodiments of the invention.

3.2 Interposition

An application client 110 may send a request, often using a client program 120 such as a web browser, to a server 180. A request may be in any format or conform to any protocol that the application client 110 and server 180 are capable of understanding. For example, a request to view or add an entry to a task list may conform to the Atom protocol.

The application client 110 may, however, reside on a mobile computing device such as a smart-phone, personal digital assistant (PDA) or laptop computer. If the mobile computing device experiences intermittent connectivity, the application client 110 may exhibit undesirable behavior. For example, the application client 110 may display only partial data, outdated data, no data at all, or even an error message.

An intermediary 130, acting as an interposition agent, may intercept and respond to requests from the application client 110 to the server 180. By interposing between the application client 110 and the server 180, the intermediary 130 can take control of the communications in a way that may optionally be transparent to the application client 110.

Intermediary 130 may optionally operate as a plug-in to the client program 120. In one embodiment, intermediary 130 may be automatically downloaded from a network upon the detection of an event or request associated with intermediary 130. Optionally, intermediary 130 may operate as a software module, a library or as a layer of software. In one embodiment, intermediary 130 may be embedded into the application client 110 or another program, and may run in the same process as the program in which intermediary 130 is embedded. In another embodiment, intermediary 130 may be executed upon the detection of a triggering event. For example, a request may be made to a program that has registered intermediary 130 as the handler of the particular type of request. Upon receiving the request, the program may cause intermediary 130 to execute.

Intermediary 130 may be configured to support protocols that are used to access and manipulate web data. For example, intermediary 130 may be configured to support Atom, Really Simple Syndication (RSS), or any other protocol. If all requests between an application client 110 and server 180 conform to a protocol supported by the intermediary 130, then the intermediary 130 may respond to an intercepted request in a manner that conforms to the protocol used by the application client 110.

Control panel 140 may be used to configure intermediary 130. For example, intermediary 130 may be configured to intercept requests and replies for a variety of applications residing on the computing system. Configuration may also take place automatically, through installation routines performed during the installation of an application on the computing system.

Control panel 140 may also be used to monitor synchronization status. For example, if a synchronization operation results in an error, control panel 140 may report these errors. Control panel 140 may take the form of a web page or other application program, and may reside locally or at a server.

Intermediary 130 may be configured to handle all requests from one or more applications. If intermediary 130 is configured to respond to an application in a manner conforming to a protocol, that application may assume that network connectivity exists at all times. This is because the application can expect a response from the intermediary if there is no connectivity. If there is connectivity, the application can expect a response from the server. For example, an application developer may write an application in such a way that the application expects constant connectivity to a particular server. The intermediary 130 may be configured to manage all communications between the application and the server. Thus, the application developer need not program a contingency into the application, such as a separate database and file structure to store offline data. Without the intermediary 130, the application would need to take into consideration the intermittent nature of the network connection by detecting the network status and providing data to the application from either the network or an offline data store.

The intermediary 130 may be configured to respond only to requests that occur when network connectivity is unavailable. Alternatively, the intermediary may be configured to respond to particular requests by applications for which the intermediary has been configured, or all requests.

Intermediary 130, sync manager 160, or any other associated component may be configured to perform actions described herein based on built-in or configurable policies. Policies may be related to time, power consumption, communication privacy, network usage cost, network availability, conflicts caused by server contention, or user expressed preferences. Other configurable policies may also be implemented. For example, a policy may be based on the time of day, or a specified time interval, or schedule. Other policies may be device related, such as those related to power consumption and processing power.

In an embodiment, application client 110 may send a request addressed to server 180. The request conforms to a protocol. For example, the request may conform to the Atom protocol, and the expected response may be to provide a listing of news stories in the Atom feed format. The intermediary 130 may intercept this request, formulate a response, and respond to the application client 110 with the expected data. The response may include any number of indicators. For example, the response may include data freshness information, alerting the application to the age of the data provided. Another indicator may disclose to the application program 110 that the response is from an intermediary, and not from server 180.

An application client 110 may make any type of request conforming to a protocol supported by the intermediary 130. Intermediary 130 may intercept and respond to all of these requests.

Application client 110 may make a request to store or publish data on server 180. If the request is made using a protocol known to the intermediary 130, then the intermediary 130 may respond to the request. In this case, intermediary 130 may intercept the request to store information on server 180 and respond to the application on behalf of server 180, informing application client 110 that the request to store data was successful. Intermediary 130 may respond according to the protocol, indicating success, even if the data has not actually been stored on server 180 and the request has in fact not been successful.

In some cases, intermediary 130 may not be configured to recognize a particular protocol. In such circumstances, intermediary 130 may ignore the request. Alternatively, intermediary 130 may intercept the request that does not conform to a configured protocol, and then forward the request to server 180 for processing.

In another embodiment, intermediary 130 may be configured to recognize a subset of methods available to a particular protocol. For example, some protocol methods may require more processing than is appropriate for the intermediary 130. Optionally, intermediary 130 may be configured to recognize all methods available to a protocol, but policies may cause a particular method to be ignored. For example, certain methods may be ignored when battery power is low.

Intermediary 130 may respond in any way that conforms to the protocol being used. For example, intermediary may have access to data that is not even on server 180. Furthermore, server 180 may be unavailable. In such a case, intermediary may respond to a request for data by providing data to the requesting application client 110, even if the data provided is not stored on the server 180 from which the data was requested. Intermediary 130 may inform the application client regarding the source, circumstances, and context of the data being delivered, or may be configured to "trick" the application into determining that the data actually came from the server, making the intermediary transparent to the application client 110.

3.3 Local Storage of Data

Data may be stored locally in storage 150. Storage 150 may be in the form of volatile or non-volatile memory, and may be accessible by intermediary 130. Storage may be compressed, encrypted, or otherwise modified to meet design, architecture, security, or performance goals. Alternatively, all or a portion of storage 150 may reside at a remote location that is different from server 180. However, local storage of data allows data to be available to applications even when a network connection is unavailable.

For example, storage 150 may contain a copy of a particular Atom feed that originated from server 180. Application client 110 may request the particular Atom feed using the URL for the feed. Intermediary 130 may intercept this request, and Intermediary 130 may respond to the request with the copy of the particular Atom feed from storage 150. Thus, the application client 110 may make a request from server 180, but will receive the feed that is stored locally in storage 150. Although this may be particularly useful when a network connection is unavailable, this condition is not required, and other benefits may be realized even when network connectivity is available.

As an optimization, data stored locally may be stored in a bitstream. A bitstream represents the data in a form consistent with the form the data would conform to when the data is sent over a network. Storing data in a bitstream eliminates the need for data transformation, reducing overhead, and allowing applications to receive data in one expected format. Thus, when intermediary 130 honors a request for data using data in storage 150, intermediary 130 sends the data to the requesting application in the form of a bitstream. Therefore, an application that is programmed to accept only network data need not be altered to accept other formats. This is because the bitstream is delivered to the application in the same format in which it was stored in storage 150.

Local storage 150 may also store publishing data that has not yet been stored on the server. For example, application client 110 may request to publish an entry to an Atom data feed on server 180. If server 180 is unavailable, intermediary 130 may intercept the request to store data and cause the data to be stored locally. The intermediary 130, which has been configured to conform to at least the Atom protocol, may then respond to the application client 110, indicating that the storage operation was successful. This implies to the application client 110 that the data has been stored on server 180, even though the data has not been stored on server 180, but has only been stored in local storage 150. Subsequently, application client 110 may make a request for the very data that was meant to be stored on server 180. Application client 110, informed that the data has been stored on server 180, properly makes a request to server 180 for the data. However, in the case where network connectivity has yet to be restored, the requested data may still only exist in local storage 150. Intermediary 110 intercepts the request and returns the requested data from local storage 150.

Finally, each element in an Atom feed may have a corresponding URL, so a request made to the URL for an element in a feed is capable of being honored by the intermediary if the feed has been stored locally, even if this is the first request for the particular URL. This functionality may be credited to the intermediary's understanding of a particular protocol. For example, if the intermediary knows the URL structure of an Atom feed, it may allow direct access to any element in the feed without requiring a request for the entire feed.

3.4 Write-Through Caching of Data

In an embodiment, intermediary 130 performs advanced protocol enabled write-through caching of web data. Write-through means that the intermediary 130 relays the request to the server in real-time. The intermediary 130 can process the responses received from the server as well as other observable side effects of the protocol. This method differs from traditional caching techniques because the intermediary 130 is protocol aware. Intermediary 130 is capable of performing protocol-specific operations on data received from a server or other sending entity.

For example, intermediary 130 may issue a request to server 180 on behalf of client 110. The request may be a request to change the data value associated with a particular resource. However, as a side-effect of changing this value, the value of a second resource may be changed. Intermediary 130 receives a response from server 180, which, by implication, makes intermediary 130 aware of the second resource. Because intermediary 130 understands the protocol being used, intermediary 130 will understand the nature of the side-effect and take appropriate actions such as requesting the second resource from server 180.

3.5 Write-Back Caching of Data

In an embodiment, write-back caching of data is performed. A request originating from an application is intercepted and processed locally by intermediary 130. The intermediary is capable of handling interception management and processing. Optionally, the functions of the intermediary may be performed by separate logical entities. For example, the intermediary may perform interception management while a local server performs protocol specific interception processing.

In an embodiment, local processing is performed using data in local store 150. The resulting data is then stored in the local store 150. Resulting data, for example, may represent data that previously existed in the local store 150, and that has been altered, updated, or otherwise affected by local processing. In an embodiment, local processing may result in the removal of data. In such a case, the data removal may be reflected in the local store 150. Optionally, a backup may be made of altered or deleted data.

The original request is stored so that it may be processed later by server 180. The intermediary 130 or other logic associated with intermediary 130 responds to the application that issued the request using the result of local processing. In an embodiment, the request is subsequently sent to server 180 for processing.

In an embodiment, the application receives the result of the local processing as a response. In another embodiment, the application additionally receives the result of the server processing as a response.

If inconsistencies exist between the local data after local processing and the server data after server processing, the intermediary 130 may resolve the inconsistency. The inconsistency resolution process may be configured based on any policy-related criteria, rules, or application-specific decision making process.

For example, an address book may be updated locally to reflect a new phone number for a particular contact that exists in a feed. Meanwhile, the phone number may be updated on the server. When the request to update the phone number is sent to the server, the server may respond with a message indicating a conflict in data. The intermediary 130 may, based on configured rules or policy criteria, instruct the server to accept the local phone number. In another embodiment, the intermediary 130 may instruct the server 180 to keep the server data and discard the local changes. In this case, the intermediary may also store the server data locally.

Requests by the application to store data may be stored and synchronized at a later time. For example, application 110 may request to publish an entry to an Atom data feed on server 180. If the network connection between client program 120 and server 180 is unavailable, intermediary 130 may intercept and store the request. Although intermediary 130 will store the entry locally in storage 150, server 180 will not be updated with the entry until network connectivity is restored. Once network connectivity is restored, sync manager 160 may forward the request to server 180 for processing.

3.6 Bi-Directional Synchronization

Bi-directional synchronization support may be enabled. Sync manager 160 performs synchronization operations. Since data from the server may be stored locally and data meant to be published to the server may be stored locally, it is prudent to ensure continuity between the local storage 150 and the data managed by the server 180 for the application.

Atom feeds in particular are designed for archiving, and provide permanent identifiers for each piece of information in a feed. This makes it possible to correlate copies of the same data. Atom feeds also contain timestamps, further simplifying the data synchronization process.

Local data in local storage 150 may be updated every time a request is honored by server 180. For example, in the presence of network connectivity, application client 110 may make a request to server 180 for feed information. Since network connectivity is available, the intermediary, in an embodiment, may not manage the request but may transparently intercept the reply from server 180. After intercepting the reply, a copy of the bitstream may be stored in local storage 150.

Alternatively, sync manager 160 may be configured via control panel 140 to periodically synchronize data for particular applications. In such an embodiment, data in local storage 150 may be synchronized with data managed by server 180, even if no request is made by application client 110. This ensures that in a case where network connectivity is unavailable, the application will have access to the most up-to-date data possible.

Multiple applications using a variety of protocols may concomitantly rely on the intermediary 130 and sync manager 160. Due to the ability of the intermediary 130 and sync manager 160 to support protocols, synchronization operations are application independent. This enables application developers to reduce the overall footprint of applications on a device.

Any number of requests may be stored locally at a given time. For example, several applications which are unrelated to each other may make requests which are intercepted and stored by the intermediary 130. Using control panel 140, sync manager may be configured to automatically synchronize data related to all applications when network connectivity is established. Alternatively, Sync manager 160 may be configured to synchronize applications according to preferences unique to each particular application. For example, a first application may be configured to synchronize only upon user direction, while a second application may be configured to synchronize every 10 minutes. A third application may be configured to synchronize every time connectivity is established and a request is pending.

3.7 Example Embodiment

Figure 2:
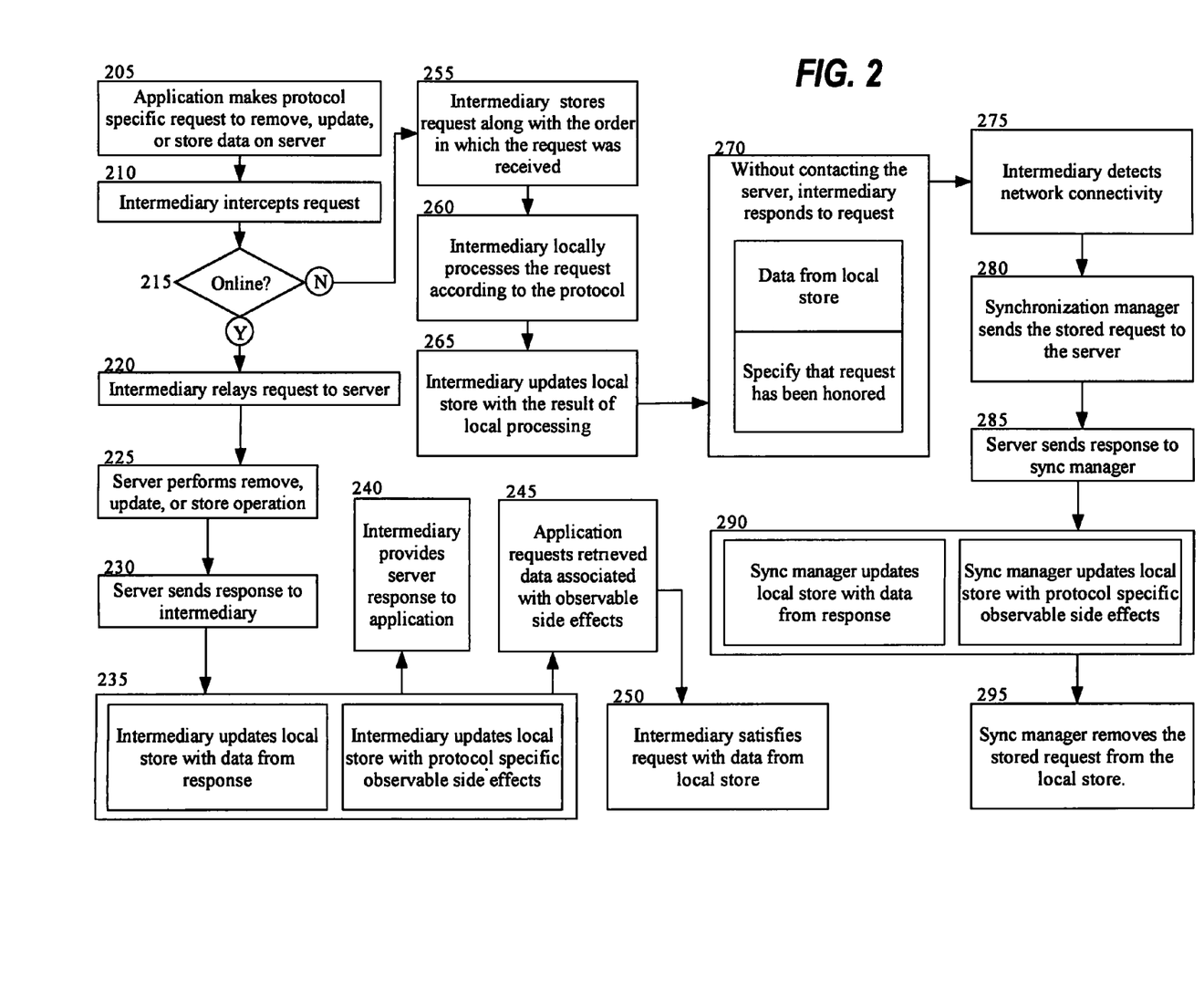
FIG. 2 is a flow diagram illustrating a procedure for managing requests in an embodiment.

FIG. 2 is a flow diagram representing an exemplary embodiment. At step 205, an application 110 makes a request, conforming to a particular protocol, to remove, update, or store data on a server 180. At step 210, an intermediary 130 intercepts the request. At step 215, a determination is made as to whether a network connection is available. In an embodiment, a determination regarding network availability may take into consideration connectivity policies, available quality of service, bandwidth availability, which network is available, or any other criteria. Thus, intermediary may make a policy decision to not use a network, even in cases where network connectivity exists at some level. If a network connection is available, the flow proceeds to step 220. If a network connection is not available, the flow proceeds to step 255.

At step 220, the intermediary 130 relays the request to the server 180. At step 225, the server 180 performs the remove, update, or store operation. At step 230, the server 180 sends a response to the intermediary 130 in a manner conforming to the particular protocol. At step 235, the intermediary updates the local store 150 with data from the response, and the intermediary updates the local store 150 with observable side effects implied by the particular protocol. At step 240, the intermediary 130 provides the server 180 response to the application 110. At step 245, the application 110 requests retrieved data associated with observable side effects implied by the protocol. At step 250, the intermediary 130 satisfies the request with data from the local store 150.

At step 255, the Intermediary stores the request along with the order in which the request was received. At step 260, the intermediary locally processes the request according to the protocol. At step 265, the intermediary updates the local store 150 with the result of local processing. At step 270, without contacting the server 180 the intermediary 130 responds to the request, in a manner conforming to the protocol, with data from the local store 150, and specifies that the request has been honored. At step 275, the intermediary 130 detects network connectivity. At step 280, the synchronization manager 160 sends the stored request to the server 180. At step 285, the server 180 sends a response to the synchronization manager 160. At step 290, the synchronization manager 160 updates the local store 150 with data from the response, and updates the local store 150 with protocol specific observable side effects. At step 295, the synchronization manager 160 removes the stored request from the local store 150.

3.8 Protocols

A protocol defines rules for syntax (including data formats), data types, semantics, interface functions and/or behavior. For example, a protocol may define the way a message must be formatted in order to be understood by another entity that recognizes the rules of the protocol, and how the other entity behaves in response to a message.

There are two larger categories of protocols: simple protocols and complex protocols. Simple protocols and complex protocols may each be used in an embodiment.

A simple protocol is a protocol that is capable of getting and setting information, but does not have involve side effects or have the ability to create or remove locations. For example, a simple protocol may allow access to and updating of a memory location. However, a simple protocol will not facilitate allocation of additional memory space. Furthermore, simple protocols do not allow for observable side effects, such as the updating of a second value, in addition to a first value, in response to a request to update only a first value. In an embodiment, one or more simple protocols are used.

Complex protocols, on the other hand, allow the creation and elimination of locations. For example, Atom Publishing Protocol allows for the creation of web-based resources, such as elements of a feed.

Protocols may be those promulgated by recognized standards bodies such as the World Wide Web Consortium (W3C) or the Internet Engineering Task Force (IETF). Examples of such protocols that are supported include Hypertext Transfer Protocol (HTTP) and extensions of HTTP, Lightweight Directory Access Protocol (LDAP), Atom Publishing Protocol, and Hypertext Markup Language (HTML) 5 Offline Application Cache Protocol. Protocols may also be proprietary protocols, such as Hierarchy Extensions to Atom Feeds. (http://www.oracle.com/technology/tech/feeds/spec/draft-divilly-atompub-hierarchy-00.txt) The intermediary 130, control panel 140, and sync manager 160 may natively support many useful protocols. Other protocols may be added as necessary.

Representational State Transfer (REST) based protocols are particularly well-suited for integration with embodiments, as these protocols use URLs to locate and manage data. Although most REST based protocols such as Atom are capable of a large variety of operations, the four basic operations are as follows:

| HTTP Method | Action | Description |
| --- | --- | --- |
| POST | CREATE | Create a new resource |
| GET | RETREIVE | Retrieve a representation of a resource |
| PUT | UPDATE | Update a resource |
| DELETE | DELETE | Delete a resource |

Although the use of the Atom protocol has been discussed for consistency and clarity, a person skilled in the art will recognize that any number of protocols may be used. Intermediary 130 may be configured to recognize any useful protocol, including custom protocols. A custom protocol may even be created by an application developer. Intermediary 130 is capable of supporting non-standard operations implemented by custom protocols or other protocols that expand on standard operations, and is therefore not limited to using only POST, GET, PUT, and DELETE.

Intermediary 130, when configured with a particular protocol, is capable of emulating any entity that uses that protocol. For example, an intermediary configured with the Atom protocol is capable of recognizing a request for an Atom data feed or an entry within the feed. It is the ability to recognize protocol specific information that allows the intermediary 130 to respond to requests in place of the server 180. This is because the intermediary predicts and formulates the response that a server would provide to the requester, given a particular request.

Intermediary 130 is also capable of making requests to a server 180 on behalf of an application 110. These requests may be requests by the application that are stored due to lack of network connectivity, or they may be requests formulated by the intermediary 130. For example, intermediary 130 may be configured to request a particular feed on a periodic basis. Application client 110 may be unaware of this configuration, and intermediary 130 may request data from server 180 several times without a request being made by the application client 110. Although the application may be unaware of the periodic updates, the user benefits from such updates in a case where network connectivity fails. If synchronization has been occurring periodically, when the application makes a request for data, the data may be more up-to-date than it would have been if the sync manager 160 were configured to only synchronize upon request by the application, and periodic synchronization had not occurred.

3.9 Security Considerations

In an embodiment, a request may require authentication to be honored. For example, a request by an application to publish data at a server may require authentication with that server. In such a case, the intermediary will not facilitate the first communication between the application and the server. The communication will be intercepted, along with any session, authentication, and other protocol specific information required to facilitate authenticated connectivity. The intermediary 130 may then perform as an interposition agent, but will attach authentication specific information along with subsequent communications.

The intermediary 130 may use session specific identifiers issued by a server for authentication purposes. This allows the intermediary 130 to determine whether the same authentication information is being used for a particular request as was used in a previous request. If new authentication information is used, it is possible that a particular session has been terminated.

A server issuing session specific identifiers may invalidate the identifiers when a session is terminated. The intermediary 130 will destroy locally persistent data related to the session and residing in the data store upon invalidation of the session specific identifiers.

Using session identifiers, rather than credentials provided by the user, such as a username and password information, has additional security advantages. Session identifiers are only useful for the particular session. Thus, they are less valuable for purposes other than the intended use, making session identifiers less of a target for theft.

Since the intermediary 130 is protocol aware, it will detect when an authenticated session has been terminated. In this case, the session information will no longer be used, and additional session identifiers may be used in future sessions.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
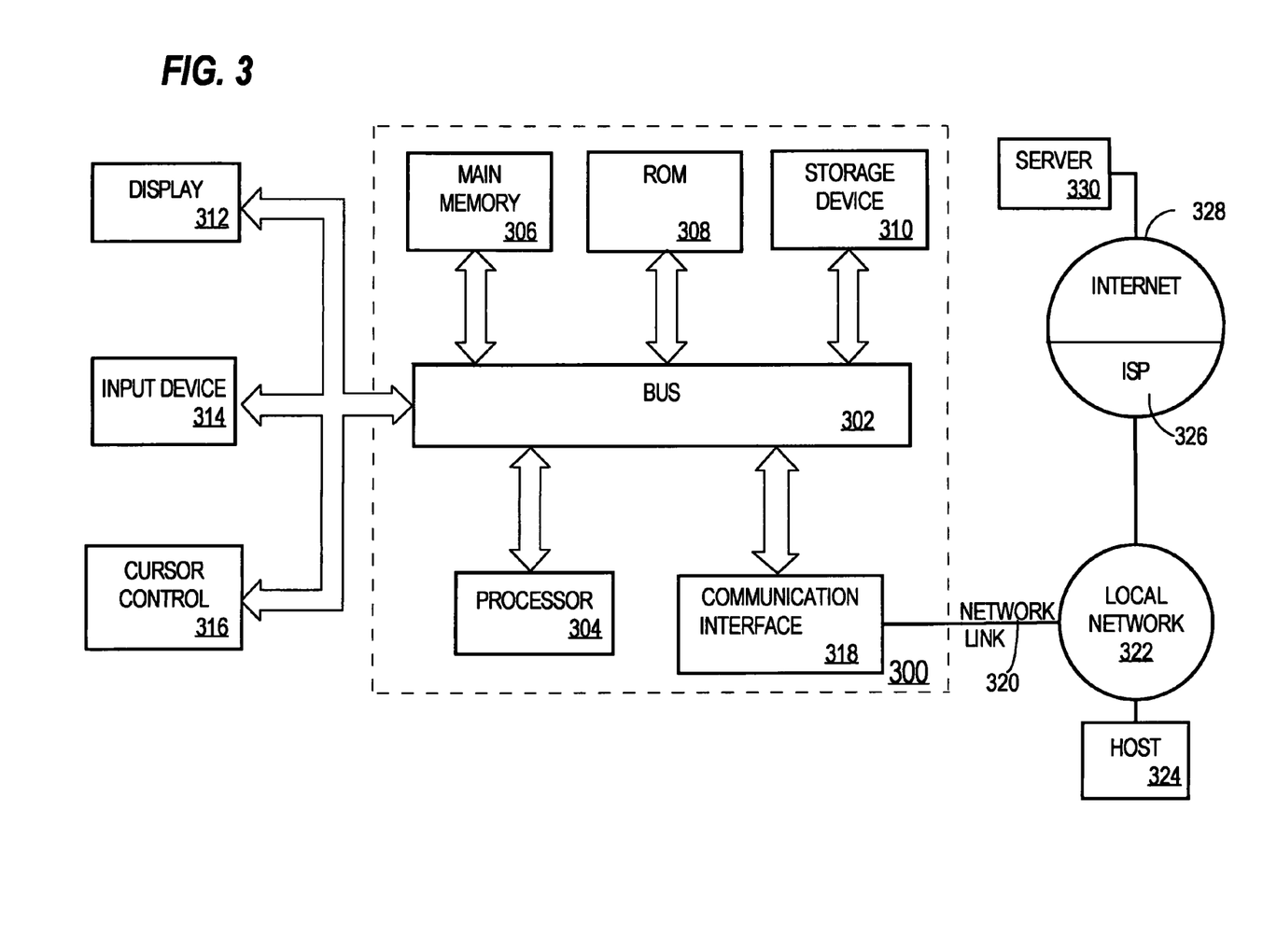
FIG. 3 illustrates a computer system upon which an embodiment may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of using an intermediary, executing on a first computing device, to facilitate communication between a first server and an application that also executes on the first computing device, the method comprising:
    intercepting, at the intermediary, from the application, a first request to remove, update or store data on the first server, wherein the first request conforms to a first protocol;
    relaying, by the intermediary, the first request to the first server using the first protocol;
    receiving, by the intermediary, a response from the first server;
    responding, by the intermediary, to the first request with the response obtained from the first server; and
    updating, by the intermediary, a local store with:
        first data obtained from the response; and
        second data implied by the first protocol and determined based on the first request;
    wherein the method is performed by one or more computing devices.

2. The method of claim 1, further comprising:
    determining that the first request should be relayed to the first server based on one or more policy criteria.

3. The method of claim 2, wherein the one or more policy criteria includes criteria related to one or more of:
    time;
    power consumption;
    communication privacy;
    network usage cost;
    network availability;
    conflicts caused by server contention; or
    user expressed preferences.

4. The method of claim 1, wherein the intermediary is executed within a same process as a application or a user agent.

5. The method of claim 1, further comprising:
    intercepting first authentication information from the application;
    wherein the response to the first request is sent after verifying the first authentication information;
    wherein the step of verifying the first authentication information comprises matching the first authentication information with second authentication information captured, by the intermediary, from a previous communication session between the application and the first server.

6. The method of claim 1, further comprising:
    intercepting, at the intermediary, from a second application running on the first computing device, a second request, wherein the second request is a request to update, remove, or store data at a second server, wherein the second request conforms to a second protocol.

7. The method of claim 1, wherein the intermediary is a browser plugin.

8. The method of claim 1, wherein the first protocol comprises:
    resources that are capable of network representations;
    access methods for obtaining network representations of resources including containers and lists;
    update methods for manipulating individual and container resources; and
    query mechanisms to identify criteria for locating resources.

9. A computer-implemented method of using an intermediary that executes on a first computing device to facilitate communication between a server and an application that also executes on the first computing device, the method comprising:

intercepting, at the intermediary, from the application, a first request to remove, update, or store data on the server, wherein the first request conforms to a first protocol;

without sending the first request to the server, locally processing, by the intermediary, the first request in a manner conforming to the first protocol;

updating, by the intermediary, a local store with results of locally processing the first request;

responding, by the intermediary, with a first response to the first request using the results of locally processing the first request;

after responding to the first request, forwarding, by the intermediary, the first request to the server using the first protocol;

receiving, by the intermediary, a second response from the server, wherein the second response is a response to the first request;

updating, by the intermediary, the local store with:
  first data obtained from the second response; and
  second data implied by the first protocol and determined based on the first request;

wherein the method is performed by one or more computing devices.

10. The method of claim 9, wherein the step of forwarding the first request to the server using the first protocol is performed at a particular time, wherein the particular time is based on one or more policy criteria.

11. The method of claim 9, further comprising:
  determining that the first request should be stored or relayed to the server based on one or more policy criteria.

12. The method of claim 11, wherein the one or more policy criteria includes criteria related to one or more of:
  time;
  power consumption;
  communication privacy;
  network usage cost;
  network availability;
  conflicts caused by server contention; or
  user expressed preferences.

13. The method of claim 9, wherein the intermediary is executed within a same process as a application or a user agent.

14. The method of claim 9, wherein the first protocol comprises:
  resources that are capable of network representations;
  access methods for obtaining network representations of resources including containers and lists;
  update methods for manipulating individual and container resources; and
  query mechanisms to identify criteria for locating resources.

15. A computer-implemented method of using an intermediary that executes on a first computing device to facilitate communication between a server and an application that also executes on the first computing device, the method comprising:
  intercepting, at the intermediary, from the application, a first request to access data on the server, wherein the first request conforms to a first protocol; and
  determining, by the intermediary, that the first request should be responded to using data that is available in a local store based on characteristics of the first computing device;
  without sending the first request to the server, responding, by the intermediary, to the first request using the data that is available in the local store;

wherein the method is performed by one or more computing devices.

16. The method of claim 15, wherein determining that the first request should be responded to using the data that is available in the local store is based at least in part on one or more policy criteria related to one or more of:
  time;
  power consumption;
  network usage cost; or
  network availability.

17. The method of claim 15, wherein the intermediary is executed within a same process as a application or a user agent.

18. The method of claim 15, wherein the first protocol comprises:
  resources that are capable of network representations;
  access methods for obtaining network representations of resources including containers and lists;
  update methods for manipulating individual and container resources; and
  query mechanisms to identify criteria for locating resources.

19. One or more non-transitory computer-readable media carrying instructions for facilitating communication between a first server and an application that executes on a first computing device, wherein the instructions, when executed by one or more processors, causes:
  intercepting, at an intermediary that executes on the first computing device, from the application, a first request, wherein the first request is a request to remove, update or store data on the first server, wherein the first request conforms to a first protocol;
  relaying the first request to the first server using the first protocol;
  receiving a response from the first server;
  responding to the first request with the response from the first server; and
  updating a local store with:
    first data obtained from the response; and
    second data implied by the first protocol and determined based on the first request.

20. The one or more non-transitory computer-readable media of claim 19, further comprising instructions for:
  determining that the first request should be relayed to the first server based on one or more policy criteria.

21. The one or more non-transitory computer-readable media of claim 20, wherein the one or more policy criteria includes criteria related to one or more of:
  time;
  power consumption;
  communication privacy;
  network usage cost;
  network availability;
  conflicts caused by server contention; or
  user expressed preferences.

22. The one or more non-transitory computer-readable media of claim 19, wherein the intermediary is executed within the same process as the application or a user agent.

23. The one or more non-transitory computer-readable media of claim 19, further comprising instructions for:
  intercepting first authentication information from the application;
  wherein the response to the request is sent after verifying the first authentication information;

wherein the step of verifying the first authentication information comprises matching the first authentication information with second authentication information captured, by the intermediary, from a previous communication session between the application and the first server.

24. The one or more non-transitory computer-readable media of claim 19, wherein the instructions, when executed by the one or more processors, further cause:
intercepting, at the intermediary, from a second application running on the first computing device, a second request, wherein the second request is a request to update, remove, or store data at a second server, wherein the second request conforms to a second protocol.

25. The one or more non-transitory computer-readable media of claim 19, wherein the intermediary is a browser plugin.

26. The one or more non-transitory computer-readable media of claim 19, wherein the first protocol comprises:
resources that are capable of network representations;
access methods for obtaining network representations of resources including containers and lists;
update methods for manipulating individual and container resources; and
query mechanisms to identify criteria for locating resources.

27. One or more non-transitory computer-readable media carrying instructions for facilitating communication between an application and a server, wherein the instructions, when executed by one or more processors, causes:
intercepting, at an intermediary, from the application that is running on a first computing device, a first request, wherein the first request is a request to remove, update, or store data on the server, wherein the first request conforms to a first protocol;
without sending the first request to the server, locally processing the first request in a manner conforming to the first protocol;
updating a local store with results of locally processing the first request;
responding, by the intermediary, with a first response to the first request using the results of locally processing the first request;
after responding to the first request, forwarding, by the intermediary, the first request to the server using the first protocol;
receiving, by the intermediary, a second response from the server, wherein the second response is a response to the first request;
updating, by the intermediary, the local store with:
first data obtained from the second response; and
second data implied by the first protocol and determined based on the first request.

28. The one or more non-transitory computer-readable media of claim 27, wherein the step of forwarding the first request to the server using the first protocol is performed at a particular time, wherein the particular time is based on policy criteria.

29. The one or more non-transitory computer-readable media of claim 28, further comprising instructions for:
determining that the request should be stored or relayed to the server based on one or more policy criteria.

30. The one or more non-transitory computer-readable media of claim 29, wherein the one or more policy criteria includes criteria related to one or more of:
time;
power consumption;
communication privacy;
network usage cost;
network availability;
conflicts caused by server contention; or
user expressed preferences.

31. The one or more non-transitory computer-readable media of claim 27, wherein the intermediary is executed within a same process as the application or a user agent.

32. The one or more non-transitory computer-readable media of claim 27, wherein the first protocol comprises:
resources that are capable of network representations;
access methods for obtaining network representations of resources including containers and lists;
update methods for manipulating individual and container resources; and
query mechanisms to identify criteria for locating resources.

33. One or more non-transitory computer-readable media carrying instructions for facilitating communication between a server and an application that executes on a first computing device, wherein the instructions, when executed by one or more processors, causes:
intercepting, at an intermediary that executes on the first computing device, from the application, a first request, wherein the first request is a request to access data on the server, wherein the first request conforms to a first protocol; and
determining, by the intermediary, that the first request should be responded to using data that is available in a local store based on characteristics of the first computing device;
without sending the first request to the server, responding, by the intermediary, to the first request using the data that is available in the local store.

34. The one or more non-transitory computer-readable media of claim 33, wherein determining that the request should be responded to using the data that is available in the local store is based at least in part on one or more policy criteria related to one or more of:
time;
power consumption;
network usage cost; or
network availability.

35. The one or more non-transitory computer-readable media of claim 33, wherein the intermediary is executed within a same process as the application or a user agent.

36. The one or more non-transitory computer-readable media of claim 33, wherein the first protocol comprises:
resources that are capable of network representations;
access methods for obtaining network representations of resources including containers and lists;
update methods for manipulating individual and container resources; and
query mechanisms to identify criteria for locating resources.

37. The method of claim 15, wherein determining that the first request should be responded to using the data that is available in the local store is based at least in part on one or more policy criteria related to one or more of:
communication privacy;
one or more conflicts caused by server contention; or
one or more user expressed preferences.

38. The one or more non-transitory computer-readable media of claim 33, wherein determining that the first request should be responded to using the data that is available in the local store is based at least in part on one or more policy criteria related to one or more of:

communication privacy;
one or more conflicts caused by server contention; or
one or more user expressed preferences.

* * * * *

UNITED STATES PATENT AND TRADEMARK OFFICE
CERTIFICATE OF CORRECTION

PATENT NO.       : 8,868,707 B2
APPLICATION NO.  : 12/485801
DATED            : October 21, 2014
INVENTOR(S)      : Mehta et al.

It is certified that error appears in the above-identified patent and that said Letters Patent is hereby corrected as shown below:

In The Claims

In column 16, line 33, in Claim 4, delete "as a" and insert -- as the --, therefor.

In column 17, line 45, in Claim 13, delete "as a" and insert -- as the --, therefor.

In column 18, line 15, in Claim 17, delete "as a" and insert -- as the --, therefor.

Signed and Sealed this
Twenty-third Day of June, 2015

Michelle K. Lee
*Director of the United States Patent and Trademark Office*